(12) United States Patent
Saxena et al.

(10) Patent No.: US 11,524,795 B2
(45) Date of Patent: Dec. 13, 2022

(54) ARCHITECTURE AND METHOD FOR AIRCRAFT LIGHTING SYSTEM USING A CENTRALLY LOCATED RED, GREEN, AND BLUE (RGB) LIGHT SOURCE SUBSYSTEM AND A PLURALITY OF DISTRIBUTED PASSIVE LIGHT-HEADS

(71) Applicant: HONEYWELL INTERNATIONAL INC., Charlotte, NC (US)

(72) Inventors: Sunit Kumar Saxena, Bangalore (IN); Anita Sure, Bangalore (IN); Gowtham Vankayala, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 137 days.

(21) Appl. No.: 17/093,776

(22) Filed: Nov. 10, 2020

(65) Prior Publication Data
US 2021/0229833 A1    Jul. 29, 2021

(30) Foreign Application Priority Data
Jan. 28, 2020  (IN) ............................ 202011003702

(51) Int. Cl.
| B64D 47/06 | (2006.01) |
| B60Q 1/00 | (2006.01) |
| B60Q 1/38 | (2006.01) |
| F21S 43/13 | (2018.01) |
| F21W 107/30 | (2018.01) |
| F21Y 115/30 | (2016.01) |

(52) U.S. Cl.
CPC ............ B64D 47/06 (2013.01); B60Q 1/0011 (2013.01); B60Q 1/38 (2013.01); F21S 43/13 (2018.01); *B60Q 2400/20* (2013.01); *F21W 2107/30* (2018.01); *F21Y 2115/30* (2016.08)

(58) Field of Classification Search
CPC ........ B64D 47/06; B64D 47/02; B64D 47/04; B64D 2203/00; F21W 2107/30; B60Q 1/0011
See application file for complete search history.

(56) References Cited

U.S. PATENT DOCUMENTS

| 5,690,408 A | 11/1997 | de la Pena et al. |
| 6,056,426 A | 5/2000 | Jenkins |
| 6,439,751 B1 | 8/2002 | Jones et al. |
| 2015/0341113 A1* | 11/2015 | Krug .................... H04B 10/116 398/118 |

* cited by examiner

*Primary Examiner* — Sean P Gramling
(74) *Attorney, Agent, or Firm* — Lorenz & Kopf, LLP (57) ABSTRACT

Systems and methods for an aircraft lighting system (ALS) are provided. The method includes co-locating a central light source subsystem including a blue light generator, red light generator, and green light generator, and a light generating control unit (LGCU) comprising a processor, and distributing a plurality of passive light-heads around an external surface of the aircraft. Each passive light-head of the plurality of passive light-heads is operationally coupled to a first side of a respective light switch of a respective plurality of light switches, the light switch being coupled on a second side to a light emitting output of the central light source subsystem. Controlling and actuating the light generators and the light switches in accordance with a load profile is performed by a light generating control unit (LGCU).

19 Claims, 7 Drawing Sheets

FIG. 7

ARCHITECTURE AND METHOD FOR AIRCRAFT LIGHTING SYSTEM USING A CENTRALLY LOCATED RED, GREEN, AND BLUE (RGB) LIGHT SOURCE SUBSYSTEM AND A PLURALITY OF DISTRIBUTED PASSIVE LIGHT-HEADS

CROSS REFERENCE TO RELATED APPLICATION

This application claims priority to Indian Provisional Patent Application No. 202011003702, filed Jan. 28, 2020, the entire content of which is incorporated by reference herein.

TECHNICAL FIELD

The technical field generally relates to aircraft lighting systems (ALS), and more particularly relates to an ALS using a centrally located red, green, and blue (RGB) light source subsystem and a plurality of passive light-heads distributed at various locations on the aircraft.

BACKGROUND

The exterior surface of an aircraft is often exposed to severe environmental conditions. For example, it is not uncommon for the exterior of the aircraft to be exposed to thermal temperatures ranging from −55° C. to 85° C., and for the exterior of the aircraft to experience a rapid rate of change of temperature within that range, such as 10° C./min. In addition to the temperature swings, the exterior of the aircraft can be exposed to high vibration levels, typically in the range of 13.9 g. The vibration levels can be significant; the wingtips can experience vibrations exceeding 100 G units (m/s$^2$). The exterior of the aircraft can be exposed to other harsh environmental conditions also, including weather conditions, such as: electromagnetic interferences, humidity, water, moisture, fluids, salt spray, icing/freezing rain, acidic environment; sand and dust; direct lightning, P-static, an explosive atmosphere, and solar radiation.

The harsh environmental conditions exact a toll on components that are located on the exterior of the aircraft, such as the components of an aircraft lighting system (ALS). A technical problem is presented in that the harsh environmental conditions can result in deleterious effects on the performance and lifespan of the components of the ALS.

Therefore, technologically improved architectures and methods for the ALS are desired. The desired ALS employs a strategy that protects a central RGB light source subsystem and its controller components from the harsh environmental conditions and utilizes a plurality of distributed passive light-heads. Other desirable features and characteristics of the herein described embodiments will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is an aircraft lighting system (ALS) for an aircraft, comprising: the central light source subsystem including a red light generator, a blue light generator, a green light generator, and a color mixing element, the central light source subsystem controlled by a light generating control unit (LGCU); a plurality of passive light-heads, distributed around the aircraft, and a respective plurality of light transmission elements; each light transmission element operationally coupled on a first side to the central light source subsystem, such that at least one light transmission element is operationally coupled to the red light generator, at least one light transmission element is operationally coupled to the blue light generator, at least one light transmission element is operationally coupled to the green light generator, and at least one light transmission element is operationally coupled to the color mixing element; each light transmission element operationally coupled on a second side to an associated passive light-head of the respective plurality of passive light-heads; wherein the LGCU is coupled to the central light source subsystem and each of the light switches, the LGCU configured to command the central light source subsystem to generate blue, green and red light in accordance with a light load demand profile and sensor data input.

A method for aircraft lighting system (ALS) in an aircraft is provided, comprising: co-locating a central light source subsystem including a blue light generator, a red light generator, a green light generator, and a light generating control unit (LGCU) comprising a processor, distributing a plurality of passive light-heads around an external surface of the aircraft; operationally coupling each light transmission element on a first side to the central light source subsystem, such that at least one light transmission element is operationally coupled to the red light generator, at least one light transmission element is operationally coupled to the green light generator, and at least one light transmission element is operationally coupled to the color mixing element; operationally coupling each light transmission element on a second side to an associated passive light-head of the respective plurality of passive light-heads; uploading a load profile for the passive light-heads into the LGCU; receiving navigation data and sensor data and processing it with the load profile in the LGCU; and commanding, by the LGCU, the central light source subsystem to generate red light, green light, and blue light, as a function of the load profile and sensor data.

Also provided is an aircraft lighting system (ALS) for an aircraft, comprising: a central light source subsystem co-locating a blue light generator, red light generator, and green light generator on the aircraft; a plurality (N) of passive light-heads, distributed around the aircraft; N light transmission elements; N light switches, each of the N light switches operationally coupled between the central light source subsystem and a respective one of the N light transmission elements, at a first side of the light transmission element; each of the N light transmission elements operationally coupled on a second side to a respective one of the N passive light-heads; a light generating control unit (LGCU) coupled to the central light source subsystem, comprising a processor, and programmed to: receive navigation data, FMS data, and sensor data; control the red light generator, the green light generator, and the blue light generator; and generate, as a function of a load profile, navigation data, FMS data, and sensor data, independent switch commands for the N light switches, the switch commands cause each of the N light switches to move between an open position, in which the light switch optically prevents light from the central light source subsystem from reaching the associated light transmission element, and a closed position, in which the switch optically directs light from the central light source subsystem to the associated light transmission element.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, harsh environmental conditions exact a toll on components that are located on the exterior of the aircraft, such as the components of an aircraft lighting system (ALS). A result of these harsh environmental conditions is that failure rates of individual components can increase, and the overall robustness of the ALS can be affected. Another result of these harsh environmental conditions is that, due to such physical environmental and operational limitations, in some scenarios, the light emitting components of an ALSs cannot be positioned at all locations that are deemed to have significant impacts on visibility and safety of the aircraft operation. An example of a location that is deemed to have a significant impact on visibility and safety is the engine. Accordingly, a technical problem is presented in that the harsh environmental conditions can result in deleterious effects on the performance, operation, and lifespan of the components of the ALS.

One approach to compensate for the harsh environmental conditions is the construction of suitable housings for components of the ALS, such as by providing more material hardening and ruggedization. A drawback of this approach is a higher product cost. Another approach to compensate for the harsh environmental conditions is the scheduling more frequent inspections (and subsequent repairs) of the ALS, which also leads to higher cost.

Figure 1:
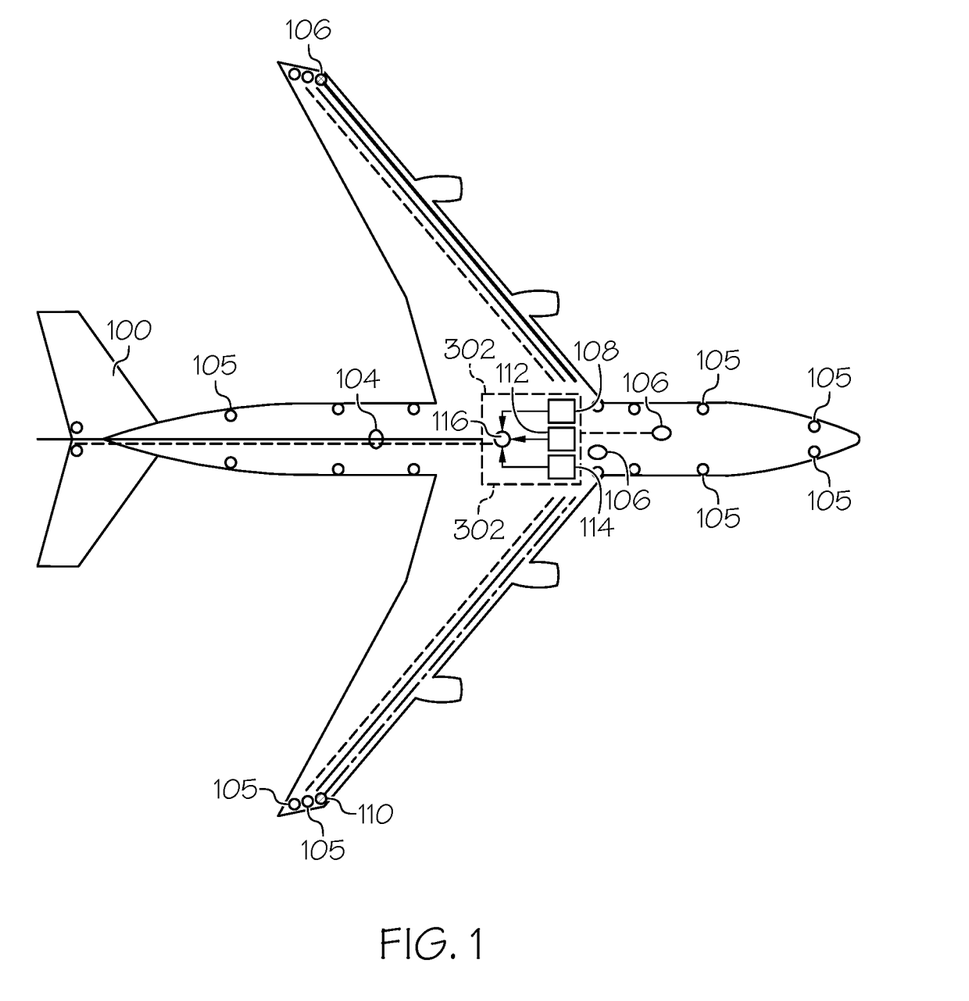
FIG. 1 is a diagram of an aircraft with an aircraft lighting system (ALS), in accordance with an exemplary embodiment.

Exemplary embodiments of the technologically improved aircraft lighting system ALS architecture comprise a centralized light source sub-system and a plurality of passive light-heads distributed at various aircraft locations (FIG. 3, 102, also referred to herein as "aircraft lighting system 102," "ALS 102," and simply, "system" 102) are provided. The ALS 102 is generally located in a mobile platform (FIG. 1, 100). In various embodiments, the mobile platform 100 is an aircraft, and is referred to as aircraft 100. Exemplary embodiments of the technologically improved aircraft lighting system 102 provide a technical solution to the described technical problem in the form of a centralized light source sub-system and a plurality of distributed passive light-heads.

Turning now to FIG. 1, an aircraft 100 with an aircraft lighting system (ALS) 102 is depicted. The system 102 operationally couples a central light source subsystem (302) to a plurality of passive light-heads (105, 106, 110), via an optical fiber cable (OFC) bus 104. The central light source subsystem 302 co-locates at least three single-color light generators: a red light generator 108, a blue light generator 114, a green light generator 112. The central light source subsystem 302 also includes a color mixing element 116 that mixes the red, green, and blue light to generate white light. The central light source subsystem 302 generates outputs: aviation red light, aviation green light, and aviation white light (which is the result of mixing the RGB light). The central light source subsystem 302 generates blue light 202 to input into the RGB color mixing element 116. The central light source subsystem 302 combines light generators at one location and routes, via OFC, the generated light around the aircraft 100. In an embodiment, the central light source subsystem 302 in a location that is protected from the harsh environment, especially as compared to the locations of the plurality of passive light-heads. In an embodiment, the passive light-heads (105, 106, 110) are distributed around the external surface of the aircraft 100.

Figure 4:
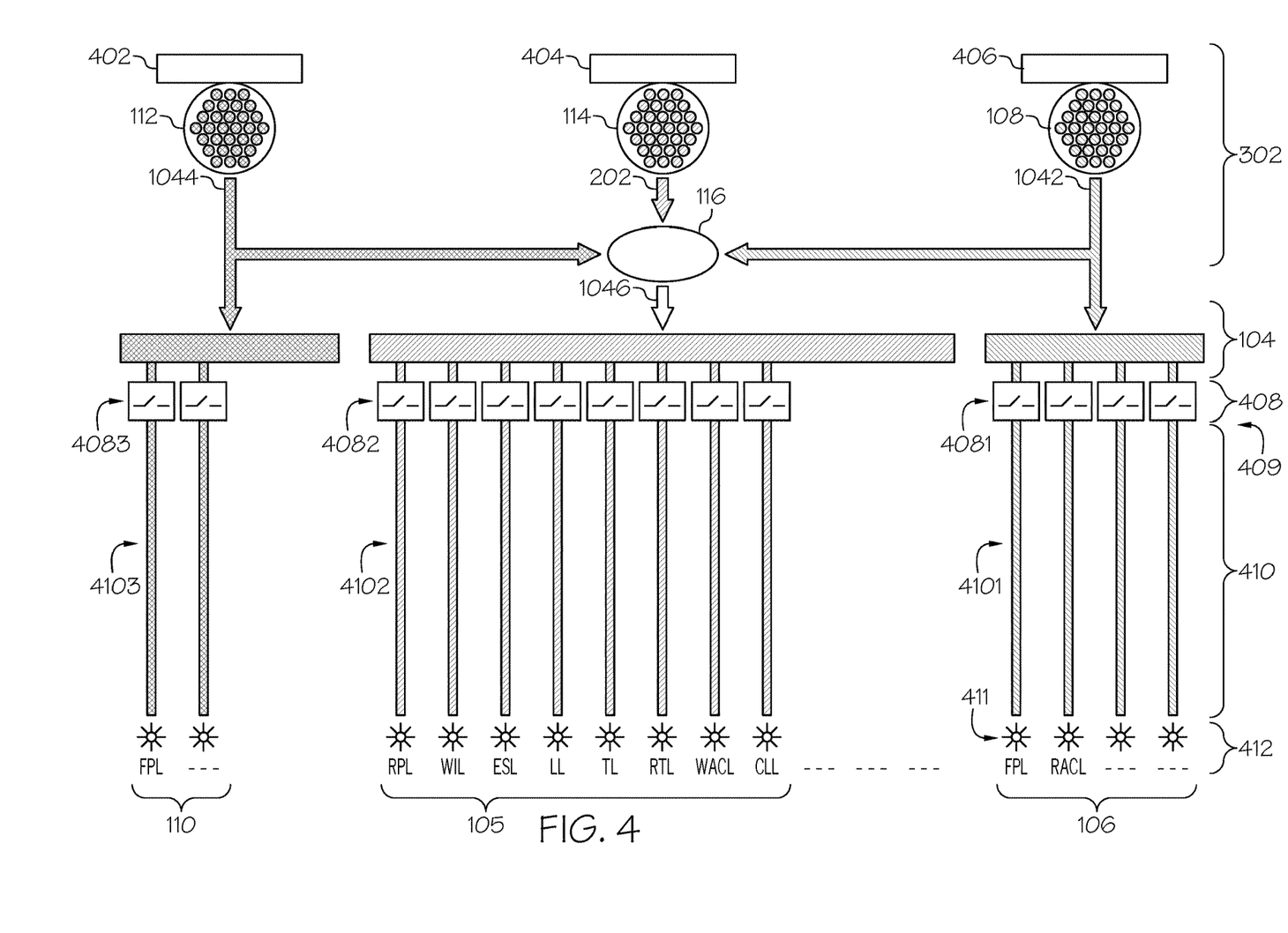
FIG. 4 depicts the central light source subsystem supplying light to a plurality of passive light-heads, via an optical fiber bus, in accordance with an exemplary embodiment.
Figure 5:
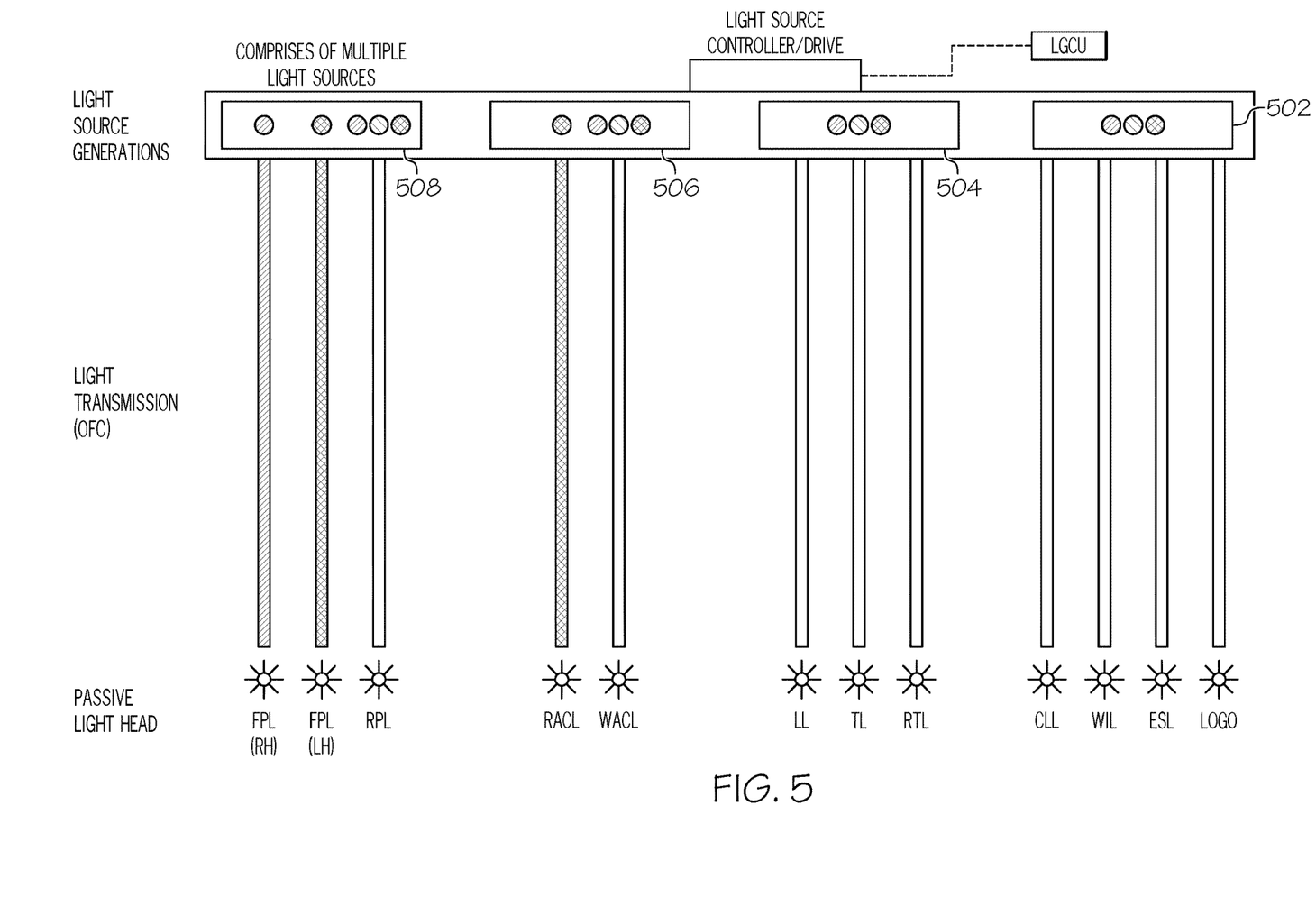
FIG. 5 depicts an architectural option for N sub-parts of for the central light source subsystem, in accordance with exemplary embodiments.

The passive light-heads (105, 106, 110) may be part or all of a variety of aircraft lighting sub-systems, including: exterior light head sub systems, such as position lights (left, right and aft), anti-collision lights (WACLs and FACLs), High power Flood lights (Landing, Taxi and Runway turn off etc.,), Medium power flood lights (Wing illumination, cargo load light and logo light etc.,), and Low Power Flood lights (Cargo service lights etc.). In an embodiment, as shown in FIG. 4, the central light source subsystem 302 co-locates the at least three single-color light generators and the color mixing element 116. In an embodiment, as shown in FIG. 5, multiple instantiations and combinations of the single-color light generators and the color mixing element 116 may be uniquely located, as a series of sub-parts, to suit the needs of the one or more of these aircraft lighting sub-systems.

For the purpose of the description, the passive light-heads (105, 106, 110) may be described as: red light-heads 106, green light-heads 110, and white light-heads 105. However, in practice, the apparatus of the passive light-heads (105, 106, 110) need not be differentiated based on the color of light that they emit. For example, a passive light-head used for a left navigation light head (which is a red color) can be the same as that of a right navigation light (which is a green color). In an embodiment, the optical cable bus 104 may include one or more transmission elements. In various embodiments, each transmission element may transmit continuous laser light and/or flashing laser light to the passive light-heads. A more detailed description of these functional blocks is provided in connection with FIGS. 2-6.

Figure 2:
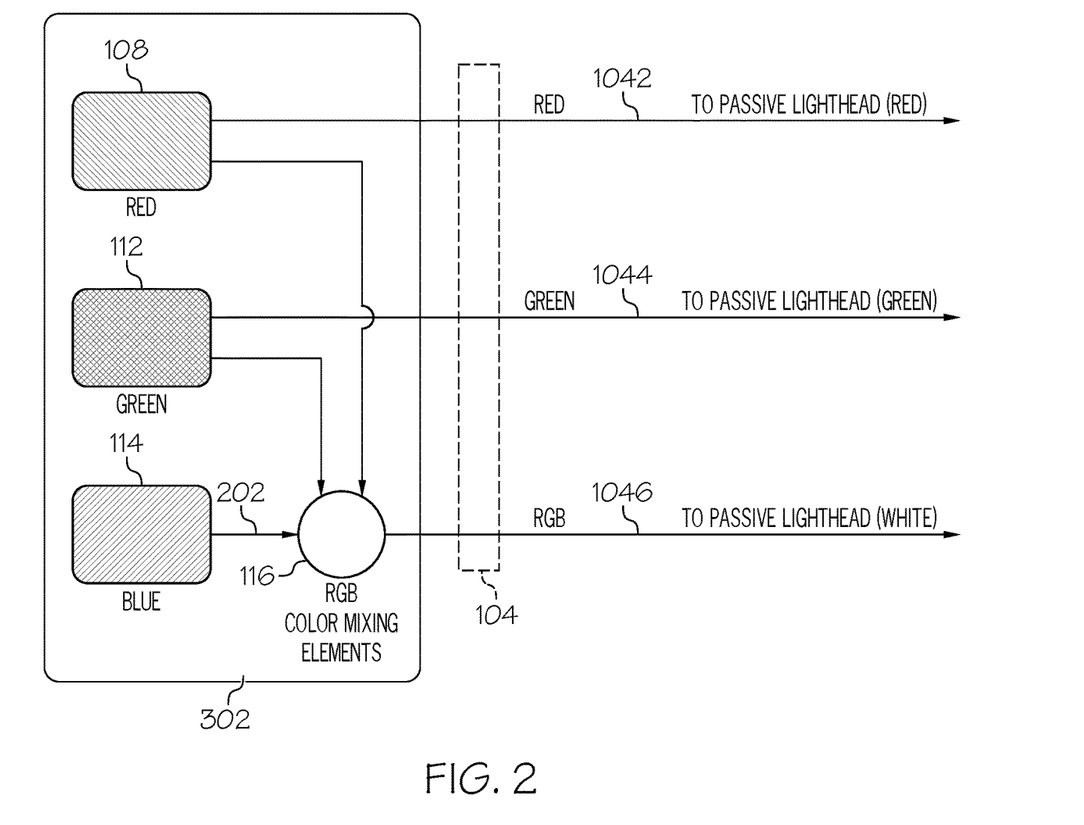
FIG. 2 is a functional block diagram showing a central light source subsystem supplying red, green, and yellow light to passive light-heads, in accordance with an exemplary embodiment.

FIG. 2 depicts the output of the central light source subsystem 302 as an input to the OFC 104. For the purpose of the description, the transmission element OFC 104 is depicted as including at least three transmission elements: a red transmission element, OFC 1042; a green transmission element, OFC 1044; and a red-green-blue (RGB) transmission element, OFC 1046. However, similar to the comment above regarding the passive light heads (105, 106, 110), the light transmitting OFC 104 need not be differentiated by the color of light that they are transmitting.

The central light source subsystem 302 is depicted as generating red laser light for OFC 1042, generating green laser light for OFC 1044, and generating, via the RGB color mixing element 116, white laser light for OFC 1046. The RGB color mixing element 116 receives, and mixes, red light from red light generator 108, green light from green light generator 112, and blue light 202 output from the blue laser light generator 114, generating therefrom RGB light, e.g., white light.

Figure 3:
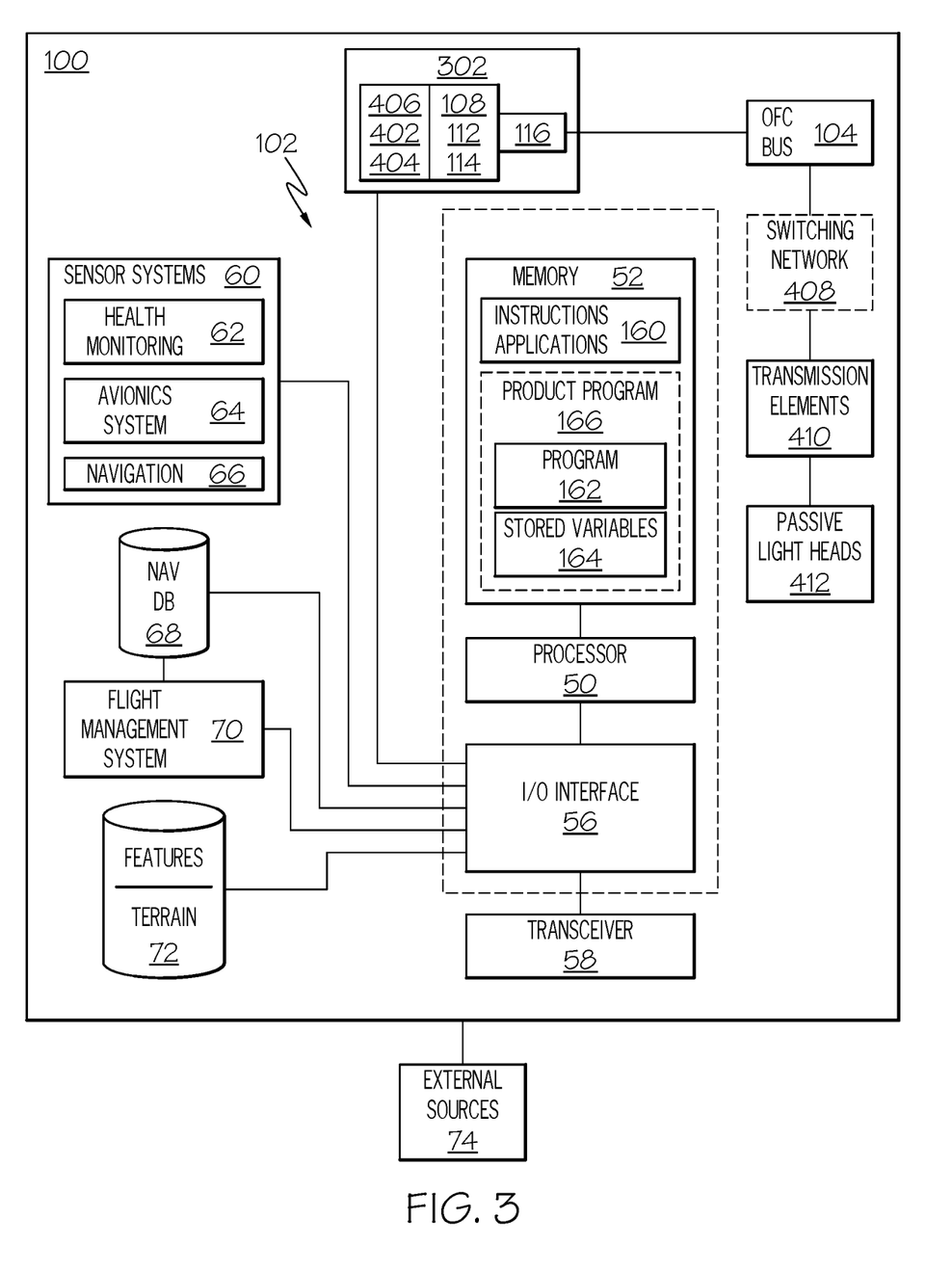
FIG. 3 is a functional block diagram of the aircraft lighting system of FIGS. 1-2, providing more detail.

The OFC bus 104 and the transmission elements operatively couple the passive light-heads to the central light source subsystem 302. The OFC bus 104 is operationally coupled to at least three passive light-heads (a red light-head, a green light-head, and a white light-head), as follows:

Turning now to FIG. 3, and with continued reference to FIGS. 1-2, an exemplary embodiment of the aircraft lighting system (ALS) 102 (also referred to herein as "aircraft lighting system," 102 and simply, "system" 102) is described in more detail. The system 102 is generally located in a mobile platform 100. In various embodiments, the mobile platform 100 is an aircraft, and is referred to as aircraft 100. The system 102 embodies a light source control unit (LSCU) (304), depicted as an enhanced computer system including a processor 50 and storage location or memory 52. The LGCU 304 may control and actuate the light generators (108, 112, 114) within the central light source subsystem 302. In some embodiments, the LGCU 304 may be integrated within a preexisting mobile platform management system, avionics system, cockpit display system (CDS), flight controls system (FCS), or aircraft flight management system (FMS 70). Optionally, the LGCU 304 may exist in an optional electronic flight bag (EFB). Further, in some embodiments, the LGCU 304 may reside in a portable electronic device (PED) such as a tablet, cellular phone, or the like.

The processor 50 performs the processing functions of the system 102. To perform these functions, the processor 50 may be operatively coupled to any combination of the following aircraft systems: sensor systems 60 (including a source of avionics systems data, such as avionics system 64, a source of health monitoring system data 62; a source of real-time aircraft status data, such as a navigation system 66) a source of prescribed flight plan data, such as a navigation database (NavDB 68); an input/output (I/O) interface 56; a transceiver 58; one or more databases 72; and a flight management system (FMS 70).

In operation, the processor 50 processes aircraft sensor data in addition to a predefined light load demand profile (FIG. 6, 900), as the sensor data input may indicate to that other demands may require adjustments to the projected light from a predefined light load profile may be present, in these scenarios the output commands of the LGCU 302 reflect the load demand profile and the sensor data. Examples include: energy optimization is required during a low fuel scenario, that there is a single engine operation scenario underway, and that there is a current need for high intensity flashing patterns to augment traffic collision and avoidance (TCAS) warnings, etc. The functions of these aircraft systems, and their interaction, are described in more detail below.

The navigation system 66 is configured to provide real-time navigation data and/or information regarding operation of the aircraft 100. As used herein, "real-time" is interchangeable with current and instantaneous. The navigation system 66 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 70, as will be appreciated in the art. The data provided by the navigation system 66 is referred to as navigation data (also referred to herein as aircraft status data). Aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. The real-time aircraft status data, or navigation data, is made available such that the LGCU 304, may further process and/or handle the aircraft status data.

Prescribed flight plan data may include a series of intended geospatial midpoints between a departure and an arrival, as well as performance data associated with each of the geospatial midpoints (the performance data including intended navigation data such as intended airspeed, intended altitude, intended acceleration, intended flight path angle, and the like). A source of a prescribed flight plan data may be a storage location or a user input device. In various embodiments, the NavDB 68 is the source of a prescribed flight plan. The navigation database (NavDB 68) is a storage location that may also maintain a database of flight plans, and/or information regarding terrain and airports and/or other potential landing locations (or destinations) for the aircraft 100. In operation, the navigation system 66 and the NavDB 68 may be integrated with an FMS 70.

In various embodiments, the avionics system(s) 64 provide aircraft performance data and feedback for subsystems on the aircraft 100. Examples of the aircraft performance data include: engine thrust level, fuel level, braking status, temperature control system status, and the like. As may be appreciated, the avionics system(s) 64 may therefore include a variety of on-board detection sensors, and, as part of the sensor systems 60, may be operationally coupled to the FMS 70.

In various embodiments, the FMS 70, in cooperation with the sensor systems 60 and the NavDB 68, provides real-time flight guidance for aircraft 100. The FMS 70 is configured to compare the instantaneous position and heading of the aircraft 100 with a prescribed flight plan for the aircraft 100. To this end, in various embodiments, the NavDB 68 supports the FMS 70 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 70 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 70 may be a source for the real-time aircraft status data of the aircraft 100.

External sources 74 communicate with the aircraft 100, generally by way of transceiver 58. External sources include: weather and surface data sources, such as a source for meteorological terminal aviation weather reports (METARS), automatic terminal information service (ATIS), datalink ATIS (D-ATIS), automatic surface observing system (ASOS); traffic data system(s); air traffic control (ATC); and a variety of other radio inputs. The traffic data system(s) may include numerous systems for providing real-time neighbor/relevant traffic data and information. For example, traffic data sources may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification.

The transceiver 58 is configured to support instantaneous (i.e., real time or current) communications between the aircraft 100 and the one or more external data source(s) 74. As a functional block, the transceiver 58 represents one or more transmitters, receivers, and the supporting communications hardware and software required for the system 102 to communicate with the various external data source(s) 4 as described herein. In an example, the transceiver 58 supports bidirectional pilot-to-ATC (air traffic control) communications via a datalink. In addition to supporting the data link system, the transceiver 58 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 74. In this regard, the transceiver 58 may allow the aircraft 100 to receive information that would otherwise be unavailable to the pilot and/or co-pilot using only the onboard systems.

In various embodiments, the LGCU 304 is additionally operationally coupled to one or more databases 72. The databases 72 may include an airport features database, having therein maps and geometries, as well as airport status data for the runways and/or taxi paths at the airport; the airport status data indicating operational status and directional information for the taxi paths (or portions thereof). Additionally, the databases 72 may include a terrain database, having therein topographical information for the airport and surrounding environment.

The processor 50 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 52 may comprise RAM memory, ROM memory, flash memory, registers, a hard disk, or another suitable non-transitory short or long-term storage media capable of storing computer-executable programming instructions or other data for execution. The memory 52 may be located on and/or co-located on the same computer chip as the processor 50. Generally, the memory 52 maintains data bits and may be utilized by the processor 50 as storage and/or a scratch pad during operation. Specifically, the memory 52 stores instructions and applications 160. Information in the memory 52 may be organized and/or imported from an external data source 74 during an initialization step of a process; it may also be programmed via a user input device.

The novel program 162 includes rules and instructions which, when executed, cause the processor 50 to perform the functions, techniques, and processing tasks associated with the operation of the system 102. Novel program 162 and associated stored variables 164 may be stored in a functional form on computer readable media, as depicted, in memory 52. While the depicted exemplary embodiment is described in the context of a fully functioning enhanced computer system, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 50) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

During general aircraft operation, the processor 50 may load and execute one or more programs, algorithms and rules embodied as instructions and applications 160 and perform tasks and operations attributed herein to the general operation of the aircraft 100. In specifically executing the tasks and processes attributed to the system 102, the processor 50 loads the instructions, algorithms, and rules embodied in the program 162, thereby being programmed with program 162. During execution of program 162, the processor 50 performs the processing activities of the system 102.

In various embodiments, the LGCU 304 may be communicatively coupled to the input/output (I/O) interface 56. The communicative coupling may be by any suitable physical or logical means of connecting computer systems and components, including, but not limited to, direct hard-wired connections, fiber optics, infrared and wireless bus technologies, to the input/output (I/O) interface 56.

The I/O interface 56 enables communications between the LGCU 304 and other system 102 components, and between the processor 50 and the external data sources 74 via the transceiver 58. The I/O interface 56 may include one or more network interfaces and can be implemented using any suitable method and apparatus. In various embodiments, the I/O interface 56 is configured to support communication from an external system driver and/or another computer system. Also, in various embodiments, the I/O interface 56 may support communication with technicians, and/or one or more storage interfaces for direct connection to memory 52. In one embodiment, the I/O interface 56 is integrated with the transceiver 58 and obtains data from external data source(s) 74 directly.

Turning to FIG. 4 and with continued reference to FIGS. 1-3, the system 102 architecture is shown in more detail. The central light source subsystem 302 may be partitioned into a respective actuator and controller for each of the single-color light generators. For example, the red light generator (108) may be controlled and actuated by a red source controller 406, the blue light generator (114) may be controlled and actuated by a blue source controller 404, and the green light generator (112) may be controlled and actuated by a green source controller 402. In various embodiments, tasks and operations attributed to the red source controller 40, the blue source controller 404, and the green source controller 402 are collectively performed by the light generator control unit (LGCU) 304.

The OFC bus 104 is operationally coupled to a plurality (N) of distributed passive light-heads 412. For the purpose of illustration, OFC bus 104 is shown as comprising: an aviation green light OFC 1044, an aviation white light OFC 1046, and an aviation red light OFC 1042. However, the apparatus of the OFC 104 (1042, 1044, and 1046) are interchangeable, and need not be distinguished from each other.

A respective plurality (N) of light transmission elements 410. Light transmission elements 410 are depicted as red light transmission elements 4101, white light transmission elements 4102, and green light transmission elements 4013; however, the apparatus of the transmission elements (4101, 4102, and 4103) are interchangeable, and need not be differentiated. Also depicted is an optional switching network 408. In various embodiments that employ switching network 408, a respective plurality (N) of light switches 408 may be used.

Some observations can be made from FIG. 4, for example, functionally: (1) each light transmission element (410) is operationally coupled on a first side to the central light source subsystem 302, such that at least one light transmission element (e.g., 4101) is operationally coupled to the red light generator 108, at least one light transmission element (e.g., 4103) is operationally coupled to the green light generator 112, and at least one light transmission element (e.g., 4102) is operationally coupled to the color mixing element 116; and, (2) each light transmission element operationally coupled on a second side to an associated passive light-head of the respective plurality of passive light-heads.

In an embodiment, one side (409) of each transmission element 410 operationally couples a passive light-head 412 to a switch associated with the respective passive light-head 412; the passive light-head 412 being operationally coupled on a second side (411) of the transmission element 410. A second side of each switch of N switches is coupled to the OFC 104.

Although various apparatus have been described as interchangeable, for the purpose of a clear routing example, the following exemplary embodiment is described: aviation red transmission element 1042 operationally couples a red passive light-head 411 to red OFC 1042; white transmission element 4102 operationally couples a white passive light-head 105 to one side of a switch, the other side of each switch is coupled to the aviation white (RGB) transmission element 1046; and each green transmission element 4103 operationally couples a green passive light-head 110 to one side of a switch, and the other side of each switch is coupled to the aviation green transmission element 1044.

As mentioned, in various embodiments, an optional switching network, with a respective plurality of light switches 408 is employed. There is a one to one unique correspondence between a light switch 408, a light transmission element 410, and a passive light-head 412: Again, for the purpose of illustration: red light switches 4081 couple red transmission elements 4101 to the aviation red transmission elements 1042; white light switches 4082 couple white (RGB) transmission elements 4102 to the aviation white (RGB) transmission elements 1046; and green light switches 4083 couple green transmission elements 4103 to the aviation green transmission elements 1044.

Each light switch 408 is controlled by the LGCU 304. Each light switch 408 serves as a gate, being operationally coupled between the central light source subsystem 302 and a first side 409 of an associated one of the plurality of light transmission elements 410. Each light transmission element 410 is operationally coupled on a second side 411 to an associated passive light-head of the plurality of passive light-heads 412. Said differently, the system 102 architecture is operationally coupling each passive light-head 412 of the plurality of passive light-heads 412 to a first side of a respective light switch, which is coupled on a second side to an output of the central light source subsystem 302. In various embodiments, the operational coupling is achieved with light transmission elements 410 and/or optical fiber cable.

The LGCU 304 is coupled to the central light source subsystem 302, the LGCU 304 is programmed to: command the red light generator 108 to generate red light in accordance with a light load demand profile (load profile, FIG. 6 900); command the green light generator 112 to generate green light in accordance with the light load demand profile 900; and, command the blue light generator 114 to generate blue light in accordance with the light load demand profile 900.

In embodiments that employ the optional switching network 408, the LGCU 304 is also configured to generate individual switch commands for each of the light switches 408 to move to the open position or to the closed position. In embodiments using the switching network 408, each light switch 408 is responsive to a respective switch command from the LGCU 304 to move between an open position, in which the light switch optically prevents the light from the central light source subsystem 302 from reaching the associated light transmission element 410 (and associated passive light-head 412) and a closed position, in which the switch optically directs the light from the central light source subsystem 302 to its associated light transmission element 410 (and associated passive light-head 412).

As may be appreciated, in various embodiments, the red light generator is one of a plurality of red light generators, the blue light generator is one of a plurality of blue light generators, the green light generator is one of a plurality of green light generators, and the color mixing element is one of a plurality of color mixing elements. In the illustration in FIG. 4, light generators of the same color are co-located. In other embodiments, as shown in FIG. 5, the central light source subsystem 302 may be configured as a number (N) of sub-parts (502, 504, 506, and 508), uniquely located around the aircraft 100. Each of the N sub-parts may comprise a combination of one or more of the plurality of red light generators, the plurality of blue light generators, the plurality of green light generators, and the plurality of color mixing elements. In the depicted embodiment, sub-part 502 comprises one each and outputs white light; sub-part 504 comprises one each and outputs white light; sub-part 506 comprises two red light generators, one blue and one green, and outputs red and white light; sub-part 508 comprises two red, two green, and one blue, and outputs red, green, and white light.

Figure 6:
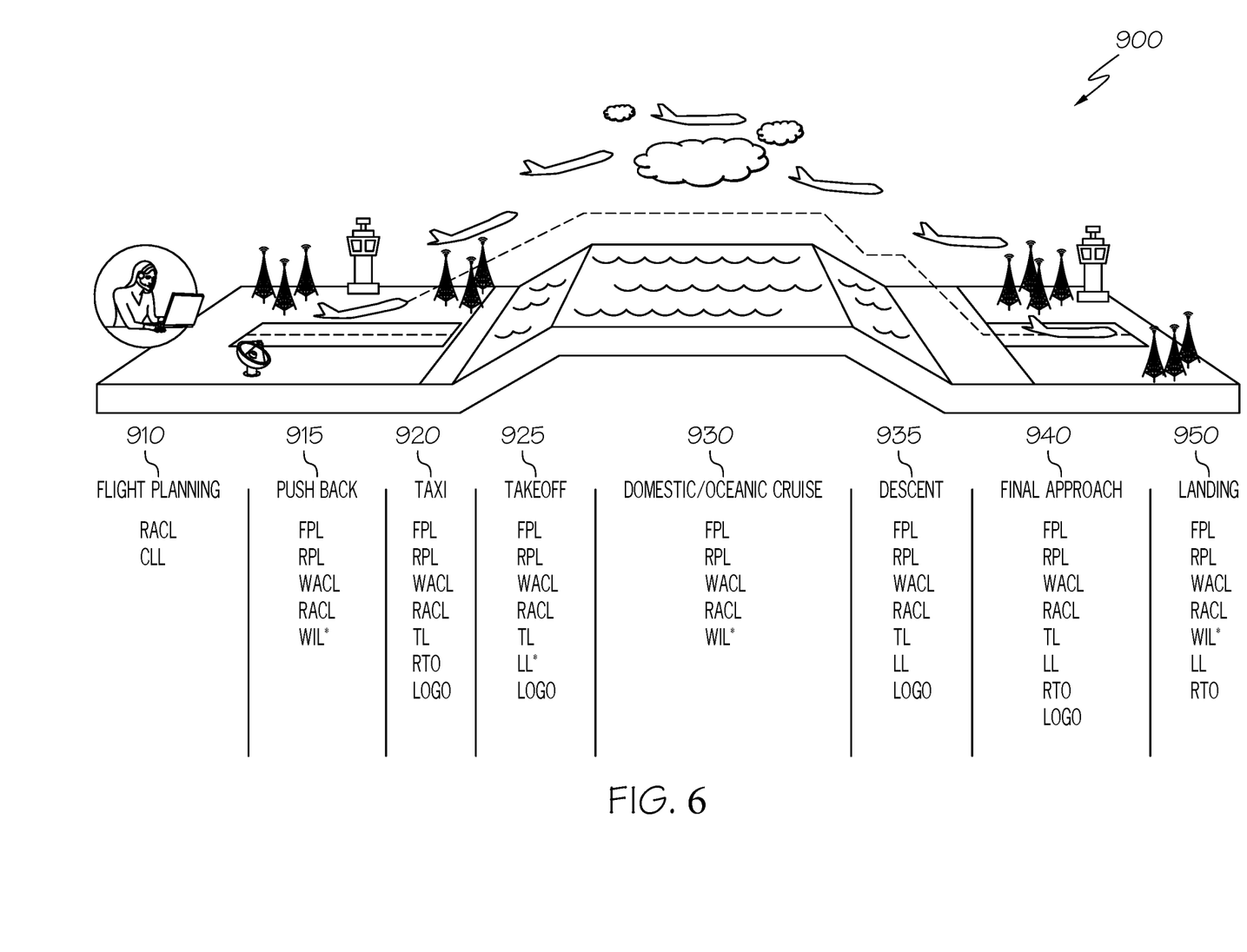
FIG. 6 illustrates a diagram of an exemplary load profile for aircraft passive light-heads at various aircraft light phases in accordance with herein described embodiments.

As may be appreciated, the various passive light-heads 412 are intended to light up at different times, based on aircraft operations and flight phases; further, aviation rules may dictate flux and intensity levels for the light-heads comprising different aircraft lighting sub-systems during aircraft operations and flight phases. When a passive light-head is lighted, its light switch 408 is necessarily open, and passive light-head 412 is a passive load on the ALS 102. Accordingly, a light load demand profile (load profile) for the passive light-heads 412 can be generated for aviation specific lighting requirements during the operation of the aircraft 100. FIG. 6 illustrates an example load profile 900 for the aircraft lighting system 102 at various aircraft flight phases, in accordance with herein described embodiments. A list of acronyms for aircraft lights is as follows: "RACL" are the Red Anti Collision Lights; "CLL" are the Cargo Loading Lights; "FPL" are the Forward Position Lights; "RPL" are the Rear Position Lights; "WACL" are the White Anti-Collision lights; "WIL" are the Wing illumination Lights; "TL" are the Taxi Lights; "LL" are the Landing Lights; "LOGO" are the Logo Lights; and "RTO" are the Runway Turnoff Lights.

Load profiles can be altered based on a user's preference. In FIG. 6, the example load profile 900 shows which passive lights to light up during each flight segment or flight phase, including: for the flight planning 910, passive lights: "RACL", "CLL"; for the push back 915, passive lights: "FPL", "RPL", "WACL", "RACL", "WIL"; for the taxi 920, passive lights: "FPL", "RPL", "WACL", "RACL", "TL", "RTO"; and "logo"; for the takeoff 925, passive lights: "FPL", "RPL", "WACL", "RACL", "TL", "LL"; and "logo"; for the domestic/oceanic cruise 930, passive lights: "FPL", "RPL", "WACL", "RACL", and "WIL"; for the descent 935, passive lights: "FPL", "RPL", "WACL", "RACL", "TL", "LL"; and "logo"; for the final approach 940, passive lights: "FPL", "RPL", "WACL", "RACL", "TL", "LL"; "RTO", and "logo"; and for the landing 950, the passive lights: "FPL", "RPL", "WACL", "RACL", "WIL", "LL"; and "RTO".

The LGCU 304 uploads the pre-defined load profile 900. During operation, the LGCU 304 monitors navigation data and matches and/or optimizes the passive loads of the passive light-heads for each of the flight phases: flight planning 910, push back 915, taxi 920, takeoff 525, domestic/oceanic cruise 930, descent 935, final approach 940, and landing 950 with a set of configurations set by modes of operation based on the particular or expected aircraft flight phase. The LGCU 304, during operation of the aircraft 100, balances the lumen demands and provides only the lumens needed to each individual passive light-head 412 of the plurality of passive light-heads 412, for each flight phase. Additionally, in various exemplary embodiments, the LGCU 304 can be programmed for predictive, expected, and/or reactive operation of the passive light-heads 412, and for a variety of operating modes, to ensure optimum luminance control. The provided ALS 102, therefore, generates appropriate flux and intensity levels for the passive light-heads, and capably corrects/adjusts levels of flux and intensity during operation, resulting in an increased life expectance and cost savings over conventional aircraft lighting systems.

Figure 7:
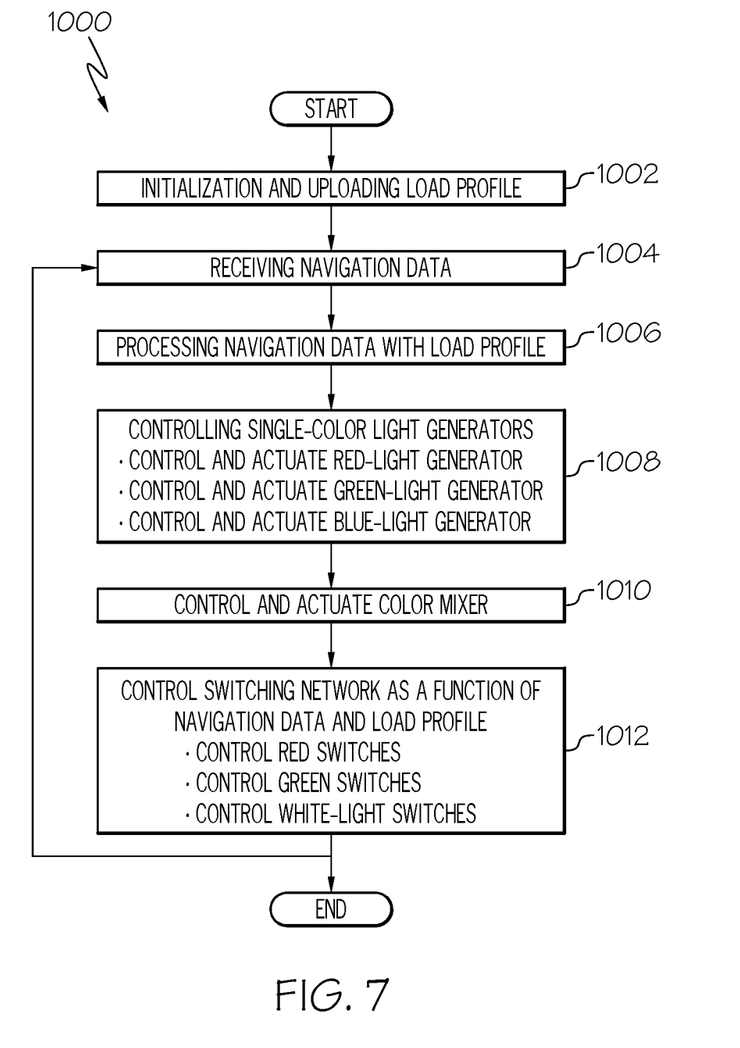
FIG. 7 is a flow chart for a method associated with an ALS, in accordance with herein described embodiments.

Referring now to FIG. 7 and with continued reference to FIGS. 1-6, a flow chart is provided for a method 1000 for the ALS 102, in accordance with various exemplary embodiments. For illustrative purposes, the following description of method 1000 may refer to elements mentioned above in connection with FIGS. 1-9. In practice, portions of method 1000 may be performed by different components of the described system. It should be appreciated that method 1000 may include any number of additional or alternative tasks, the tasks shown in FIG. 10 need not be performed in the illustrated order, and method 1000 may be incorporated into a more comprehensive procedure or method having additional functionality not described in detail herein. Moreover, one or more of the tasks shown in FIG. 10 could be omitted from an embodiment of the method 1000 if the intended overall functionality remains intact.

The method starts, and at 1002 the LGCU 304 is initialized. As mentioned above, initialization may comprise uploading or updating instructions and applications 160, program 162, stored variables 164, such as the pre-defined load profile, and the like. Initialization at 1002 may also include identifying external sources 74 and/or external signals and the communication protocols to use with each of them.

At 1004, the LGCU 304 receives prescribed flight plan data and aircraft navigation data (including location, speed, and phase of flight) and processes this data with the light load demand profile. During operation, it is understood that aircraft navigation data is continuously received and processed.

At 1006, the LGCU 304 processes the navigation data with the load profile. At 1008, the LGCU 304 commands the central light source subsystem 302 to generate light and independently actuates the individual single-color light generators. In operation, this step includes individual and independent commands for when each single-color light generator will and will not generate light. At 1010, the LGCU 304 may control and actuate the color mixing element 116. At 1012, the LGCU 304 controls the individual light switches 408 in the light switch network 408 as a function of the load profile and the navigation data. Additionally, the LGCU 304 may monitor navigation data and optimize passive loads of the passive light-heads 412 for each of the flight phases as a function of a current flight phase. After operation 1012, the method 1000 may return to 1004 or end.

Thus, technologically improved aircraft lighting systems comprising a centralized RGB light source sub-system and a plurality of passive light-heads distributed at various aircraft locations are provided. As is readily appreciated, the above examples of the system 102 are non-limiting.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft lighting system (ALS) for an aircraft, comprising:
    a central light source subsystem including a red light generator, a blue light generator, a green light generator, and a color mixing element, the central light source subsystem controlled by a light generating control unit (LGCU);
    wherein the color mixing element is configured to emit white light based on received red light, green light and blue light;
    a plurality of passive light-heads, distributed around the aircraft, and a respective plurality of light transmission elements;
    each light transmission element operationally coupled on a first side to the central light source subsystem, such that at least one light transmission element is operationally coupled to the red light generator, at least one light transmission element is operationally coupled to the green light generator, and at least one light transmission element is operationally coupled to the color mixing element;
    each light transmission element operationally coupled on a second side to an associated passive light-head of the respective plurality of passive light-heads;
    wherein:
        the LGCU is coupled to the central light source subsystem, the LGCU configured to command the central light source subsystem to generate blue, green and red light in accordance with a light load demand profile and sensor data input, and
        the LGCU interfaces with a Flight Management System (FMS) and optimizes blue light generation in accordance with aircraft phase of flight.

2. The system of claim 1, wherein
    the red light generator is one of a plurality of red light generators, the blue light generator is one of a plurality of blue light generators, the green light generator is one of a plurality of green light generators, and the color mixing element is one of a plurality of color mixing elements; and
    the central light source subsystem comprises a number (N) of sub-parts, uniquely located in association with an aircraft lighting sub-system; and
    each of the N sub-parts comprise a combination of one or more of the plurality of red light generators, the plurality of blue light generators, the plurality of green light generators, and the plurality of color mixing elements.

3. The system of claim 1, further comprising:
a respective plurality of light switches;
each light switch operationally coupled between the central light source subsystem and the first side of an associated one of the plurality of light transmission elements;
each light switch responsive to a switch command from the LGCU to move between an open position, in which the switch optically prevents the light from the central light source subsystem from reaching the associated light transmission element, and a closed position, in which the switch optically directs the light from the central light source subsystem to the associated light transmission element; and
wherein the LGCU is configured to: command each of the light switches to move to the open position or to the closed position, whereby the light generated by the central light source subsystem is selectively supplied to at least one of the passive light-heads.

4. The system of claim 1, further comprising a beam shaping optical element associated with each of the passive light-heads, configured to meet a photometric requirement of a location of a respective passive light-head.

5. The system of claim 1, wherein the light transmission elements are optical fiber cables.

6. The system of claim 1, wherein the central light source subsystem includes a laser diode.

7. The system of claim 1, wherein red light generator, blue light generator, and green light generator are independently actuated by the LGCU.

8. A method for aircraft lighting system (ALS) in an aircraft, comprising:
co-locating a central light source subsystem including a blue light generator, a red light generator, a green light generator, and a light generating control unit (LGCU) comprising a processor,
distributing a plurality of passive light-heads around an external surface of the aircraft;
operationally coupling each light transmission element on a first side to the central light source subsystem, such that at least one light transmission element is operationally coupled to the red light generator, at least one light transmission element is operationally coupled to the green light generator, and at least one light transmission element is operationally coupled to the color mixing element;
operationally coupling each light transmission element on a second side to an associated passive light-head of the respective plurality of passive light-heads;
uploading a load profile for the passive light-heads into the LGCU;
receiving navigation data and sensor data and processing it with the load profile in the LGCU; and
commanding, by the LGCU, the central light source subsystem to generate red light, green light, and blue light, as a function of the load profile, the navigation data, and the sensor data.

9. The method of claim 8, wherein the red light generator is one of a plurality of red light generators, the blue light generator is one of a plurality of blue light generators, the green light generator is one of a plurality of green light generators, and the color mixing element is one of a plurality of color mixing elements;
wherein the central light source subsystem comprises N sub-parts, each having a combination of one or more of the plurality of red light generators, the plurality of blue light generators, the plurality of green light generators, and the plurality of color mixing elements; and
wherein the method further comprises, uniquely locating the N sub-parts around the aircraft, in association with an aircraft lighting sub-system.

10. The method of claim 8, further comprising:
operationally coupling a light switch between the central light source subsystem and the first side of an associated one of the plurality of light transmission elements;
each light switch responsive to a switch command from the LGCU to move between an open position, in which the switch optically prevents the light from the central light source subsystem from reaching the associated light transmission element, and a closed position, in which the switch optically directs the light from the central light source subsystem to the associated light transmission element; and
commanding, by the LGCU, each of the light switches to move to the open position or to the closed position, whereby the light generated by the central light source subsystem is selectively supplied to at least one of the passive light-heads.

11. The method of claim 8, further comprising associating a beam shaping optical element configured to meet a photometric requirement of a location of a respective passive light-head with each of the passive light-heads.

12. The method of claim 8, wherein the light transmission elements are optical fiber cables.

13. The method of claim 8, wherein the central light source subsystem includes a laser diode.

14. The method of claim 8, further comprising, optimizing, by the LGCU, blue light generation in accordance with data received from a flight management system (FMS).

15. The method of claim 8, further comprising:
monitoring navigation data, by the LGCU; and
optimizing passive loads of the passive light-heads for each flight phase of the aircraft, as a function of the load profile and navigation data, by the LGCU.

16. An aircraft lighting system (ALS) for an aircraft, comprising:
a central light source subsystem co-locating a blue light generator, red light generator, and green light generator on the aircraft;
a plurality (N) of passive light-heads, distributed around the aircraft;
N light transmission elements;
N light switches, each of the N light switches operationally coupled between the central light source subsystem and a respective one of the N light transmission elements, at a first side of the light transmission element;
each of the N light transmission elements operationally coupled on a second side to a respective one of the N passive light-heads;
a light generating control unit (LGCU) coupled to the central light source subsystem, comprising a processor, and programmed to:
receive navigation data, flight management system (FMS) data, and sensor data;
control the red light generator, the green light generator, and the blue light generator; and
generate, as a function of a load profile, navigation data, FMS data, and sensor data, independent switch commands for the N light switches, the switch commands cause each of the N light switches to move between an open position, in which the light switch optically prevents light from the central light source subsystem from reaching the associated light transmission element, and a closed position, in which the switch optically directs light from the central light source subsystem to the associated light transmission element.

17. The aircraft of claim 16, wherein the LGCU optimizes passive loads of the passive light-heads for each flight phase of the aircraft as a function of a current flight phase.

18. The aircraft of claim 17, wherein the red light generator is one of a plurality of red light generators, the blue light generator is one of a plurality of blue light generators, the green light generator is one of a plurality of green light generators, and the color mixing element is one of a plurality of color mixing elements;
   the central light source subsystem comprises a number (N) of sub-parts, uniquely located in association with an aircraft lighting sub-system; and
   each of the N sub-parts comprise a combination of one or more of the plurality of red light generators, the plurality of blue light generators, the plurality of green light generators, and the plurality of color mixing elements.

19. The aircraft of claim 18, wherein at least one of the blue light generator, red light generator, and green light generator, includes a laser diode.

\* \* \* \* \*